United States Patent Office 2,929,108
Patented Mar. 22, 1960

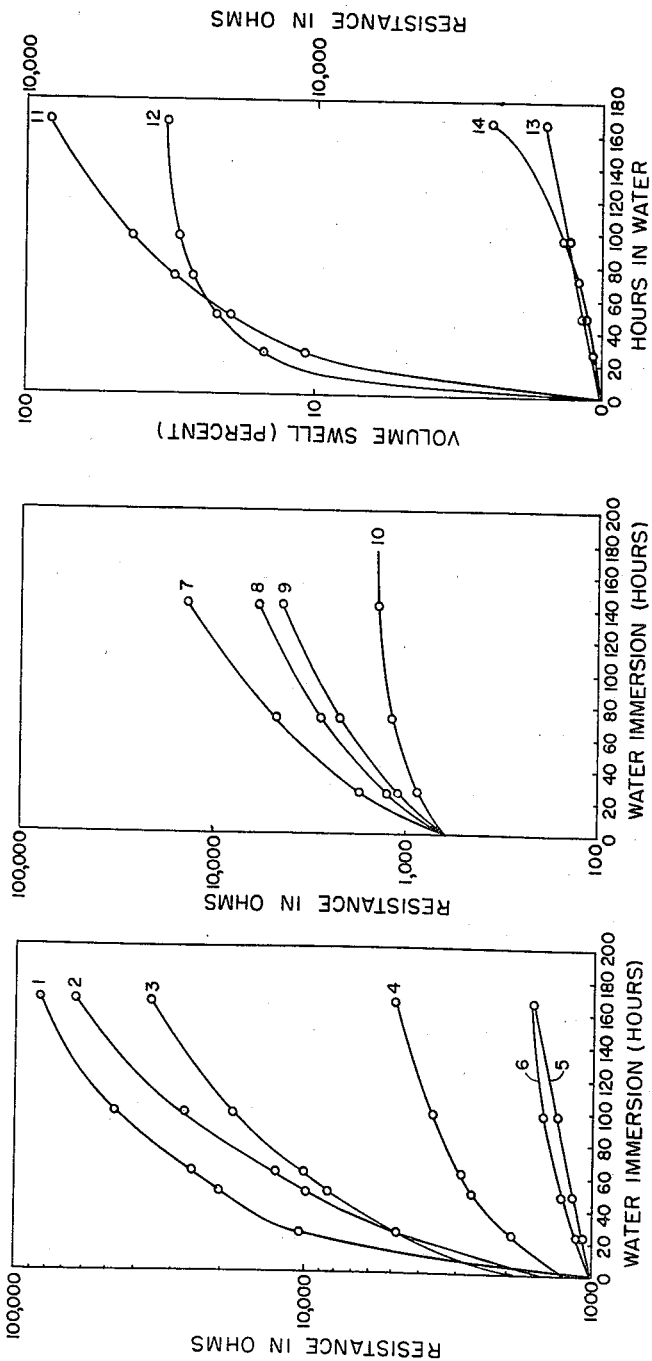
March 22, 1960     A. G. SANDS     2,929,108
METHOD FOR PREPARING CONDUCTIVE LATEX FILMS
Filed Dec. 19, 1957
INVENTOR
ARTHUR G. SANDS
ATTORNEYS

2,929,108
METHOD FOR PREPARING CONDUCTIVE LATEX FILMS

Arthur G. Sands, Cheverly, Md., assignor to the United States of America as represented by the Secretary of the Navy Application December 19, 1957, Serial No. 703,988

1 Claim. (Cl. 18—47.5)

(Granted under Title 35, U.S. Code (1952), sec. 266)

The invention described herein may be manufactured and used by or for the Government of the United States of America for governmental purposes without the payment of any royalties thereon or therefor.

This invention relates to electrically conductive latex films, more particularly to a method for preparing them in an electrically stable condition.

Thin electrically conductive films of intricate geometric shape can be readily formed from latex composition by the use of relatively cheap plaster-of-Paris molds or by coagulent dip processes. However, the electrical conductivity of the cured film is seriously affected by the action of the moisture, an effect believed to be attributable to the water-sensitive ingredients present in the film. Immersion of the film in water or exposure of the same to atmospheres of high humidity will cause the water-sensitive components to swell with separation of conducting particles and consequent loss in electrical conductivity of the film.

Dry conducting rubber stock which has been especially compounded through omission of water-soluble materials and subjected to a high state of cure will not exhibit high losses in electrical conductivity on exposure to moisture. However, dry-forming processes require costly molds or dies and are not readily adaptable to the forming of odd configurations. Consequently, from the standpoint of fabrication the latex process is the more advantageous of the two, but its use requires that the effect of moisture on the electrical conductivity of the film be minimized or eliminated.

It is therefore a principal object of the present invention to provide a method for producing thin electrically conductive latex films which exhibit a high degree of electrical stability in the presence of moisture.

I have found, in accordance with my invention, that cured, conductive latex films of high electrical stability can be obtained by subjecting the uncured latex conducting film to a boiling-water leaching to extract the water-soluble materials therefrom, and then curing the leached film. The leached conductive films can be cured in the usual way for curing of latex films, e.g., by hot air curing at 250 to 300° F.

Latex compositions customarily contain components which maintain the consistency of the dispersion up to the time of coating of the film. Such components are dispersing agents for uniformity of dispersion of the solid particles of the compositions, stabilizers, such as ammonia and casein to prevent premature coagulation, and wetting agents to reduce surface tension. All are water-sensitive materials. Omission or a material reduction in quantity of such materials from the latex compositions for the purpose of lessening swelling in the film will produce unstable systems.

Compounding of the latex compositions for use in forming films to be treated in accordance with the method of the invention can be accomplished following known procedures for the formulation of latex dispersions with the exception that a conductive material is included in the dispersion, for example, conducting carbon (powder). Natural or synthetic latices, such as the commercial latices, Hevea, GR-S and Neoprene, can be used for formulation of the compositions. High shear or ball mixing techniques or other mixing procedure which maintains stability of the latex and gives uniform films of predictable conductivity is satisfactory for compounding of the latex compositions.

It is not essential to the practice of the method of the invention that a particular latex be employed in the formation of the film. However, Neoprene latex Type 571, an alkaline aqueous suspension of chloroprene polymer, is illustrative of latices which can be used as the base for the film. It has excellent resistance to sunlight, ozone, heat-ageing, solvents, flame, and penetration of gases and liquids. The following formula is typical of those used for this Neoprene latex to obtain a desired range of conductivity, good processing characteristics, stability and resistance to weathering. Parts are by weight.

| | Parts |
|---|---|
| Neoprene Type 571 | 100.00 |
| Darvan | 2.40 |
| Aerosol OT | 3.20 |
| Bentonite clay | 0.16 |
| Casein (ammonium caseinate) | 2.40 |
| Sodium hydroxide | 0.64 |
| Zinc oxide | 5.25 |
| Neozone D | 2.10 |
| Aquarex D | 1.10 |
| Statex 125 | 39.80 |
| Water | 715.45 |

Darvan is the sodium salt of a polyalkylarylsulfonic acid and is used to disperse the conductive carbon particles (Statex 125) in the latex. Aerosol OT is sodium dioctyl sulfosuccinate and a wetting agent. Neozone D is phenyl-beta-naphthylamine and an antioxidant. Aquarex D is a mixture of the sodium salts of higher fatty alcohol sulfate esters, chiefly of the lauryl and myristyl esters, and is a latex stabilizer and mold lubricant.

Thin films of intricate shape can be formed from the latex compositions by the use of plaster-of-Paris molds. The absorption characteristics and moldability of plaster-of-Paris suggested that this inexpensive material could be adapted with relative ease to the forming of thin latex films of intricate shape. In the construction of the plaster-of-Paris molds, the plaster-to-water ratio is important since deposition of the film from the latex composition is dependent upon the absorption characteristic of the plaster. A plaster-to-water ratio of 50–50 by weight gives a mold of satisfactory absorption qualities and adequate strength for preparation of thin conductive latex films of intricate geometry. A plaster-to-water ratio of 66–33 would double the compressive strength of the mold while retaining 85% of the absorption capabilities of the plaster should this be desirable for production purposes. Forming of the plaster-of-Paris molds can be accomplished by pouring the plaster-water slurry into wooden frames. In order to avoid occluded air or pinholes in the plaster mold, the plaster is added to the water with careful mixing until creamed and the slurry then poured into the wooden frame at one corner and allowed to flow across the frame while vibration is applied to bring air bubbles to the surface. The plaster casting is air dried in the frame for about 24 hours, removed, and heated to 180° F. for about two hours to insure dryness and maximum strength. The dry plaster mold is then sprayed with a silicone mold release to facilitate stripping of the subsequently-formed latex film, care being taken not to close the pores of the plaster.

Casting of the conductive latex films in the plaster molds is accomplished by simply pouring the latex composition into the mold, allowing sufficient time for the suction effect of the dry plaster of the mold to withdraw water and solids from the latex composition to form a skin on the surface of the plaster, and then pouring off the excess of the latex composition. The rate of deposition of the latex on the plaster mold is rapid during the first few minutes and then levels off to an essentially straight line. The length of the deposition period will vary with the thickness of the latex film desired. Formation of a film of a thickness of about 40 mils will take about an hour for the deposition. The deposition period may vary somewhat for a given thickness of film depending upon the porosity of the plaster of the mold and the latex composition employed. After decanting the excess of the latex composition, the formed film is air dried before stripping from the plaster mold. For thicknesses of films of about 40 mils, for example, an air drying period of about 16 hours will generally suffice.

The air-dried latex films in the uncured condition are subjected in accordance with the method of the invention to a boiling-water leaching for a period of time sufficient to remove all or substantially all of the water soluble components therefrom, thus reducing the tendency in the cured film to swell and lose conductivity. The rate of removal of the water-solubles from the films will depend to some extent on the thickness of the film, the thinner the film, the faster generally the rate of the removal. Empirical data indicates the faster and more effective leaching will result when the bath is replaced with fresh water each hour. The amount of water used for the leaching will depend upon the thickness of the film, being the greater, generally, the thicker the film. A total of approximately seven gallons of water, for example, was required per square foot for the boiling water leaching of conducting Neoprene film of 20 mils thickness. No improvement in the leaching process was noted when tap water was replaced with distilled water. An eight hour boiling-water leach with periodic change of the water each hour will generally suffice to remove substantially all of the water-solubles from uncured films of thicknesses on the order of from about 10 to 40 mils and produce a high degree of electrical stability in the cured films. Thinner films will require shorter leaching periods.

For a more complete understanding of the effect of the method of the invention on the resistance values of latex conducting films, reference is had to the accompanying drawing in which are shown several groups of curves relating to change in resistance of a film treated by the method of the invention as against the film not so treated.

In the drawing:

Figure 1 is a group of curves depicting change in resistance of uncured and cured latex conducting films after subjection to a boiling water leaching, Figure 2 is a group of curves depicting change in resistance of uncured latex conducting films after subjecting to a boiling-water leaching and a tap water washing, respectively, and Figure 3 is a group of curves relating change in resistance to volume swell of unleached and leached latex conducting films.

In Figure 1, the group of curves show the effect of immersion in water on the resistance of the Neoprene latex conducting films, treated and not treated in accordance with the method of the invention. The D.C. electrical resistance of the films is shown in ohms and the time of immersion in water in hours. The D.C. resistance measurements were made on the cured films with a Simpson ohmmeter on film test strips 3.5 inches long and 0.5 inches wide, coated 0.25 inches on each end with conducting silver paint. Curve 1 illustrates the problem to be encountered when cured but unleached latex conducting films are in contact with water. Within 24 hours, the electrical resistance of the untreated water-immersed film sample increased by a factor of 10. Curves 2 and 3 show that little improvement in electrical stability of the film can be had by a boiling water leaching of the cured film. Curve 2 indicates results for a two hour and curve 3 for an eight hour boiling water leach of cured film samples. In contrast, a substantial increase in the electrical stability of the cured film was had with a 2 hour boiling-water leaching of the film before curing, as is shown by curve 4. By increasing the period of the boiling water leaching of uncured film to 8 hours, the cured film showed a remarkably high degree of electrical stability, as shown by curve 5. A 16 hour boiling-water leaching of uncured film showed little increase over the 8 hour boiling-water leach in electrical stability of the cured film when immersed in water, as is shown by curve 6. That longer extraction periods did not significantly alter the electrical resistance of the cured treated films on exposure to water is shown by curves 5 and 6.

The results of the tests showed that films leached after curing exhibited an electrical resistance after seven days of immersion in water which was 15 times greater than the values for the films which were leached prior to curing. In the course of the boiling-water leaching it is probable that a partial curing of the film occurs. The films, leached eight hours and cured, were approximately 50 times less sensitive to moisture than the unleached cured films after immersion in water for one week. The leached after-cured films increased in electrical resistance after 24 hours water immersion by a factor of 1.1 and after the seventh day by a factor of only 1.6 (curve 5), whereas the unleached cured films had increased by a factor of 87 after seven days immersion (curve 1).

Drying of water-wet latex conducting films which have been cured after having been leached by the method of the invention can be resorted to for regaining a large measure of the conductance of the films. For example, a cured Neoprene latex conducting film similar to those described immediately above in which the uncured film has been given an eight hour boiling-water leach was immersed in water for 287 hours and at that time had a resistance factor increase of 2.4. After 2 hours air drying of the immersed film the resistance increase factor had dropped to approximately 1.46, to approximately 1.23 after 3 hours air drying and to approximately 1.1 after 6 hours air drying. Full recovery of the conductance in the film was had after a period of about 23 hours air drying of the same.

Latex articles are customarily washed in running tap water at 70 to 75° F. for 20 to 30 minutes to remove surface contaminants. The effect of washing sample uncured films with tap water before curing is shown in Figure 2. Curve 7 is resistance change in the cured film after immersion in water for an average tap water washing period of 0 to 4 hours. Curve 8 is the resistance change for film which had been tap water-leached for 16 hours and curve 9 for fifty hours. Curve 10 is the resistance change for film which had been boiling-water leached in the uncured condition for eight hours. The film thickness in each case was 20 mils and the films cast as above from the latex composition set forth above. The films were hot-air cured at about 280° F.

Evidence that swelling of the water-soluble constituents in conducting latex films increases the electrical resistance of the cured films in contact with water is shown by Figure 3. Figure 3 is also evidence of the effectiveness of the boiling-water leaching process of the invention to minimize this condition in conducting latex films. The curves 11, 12, 13 and 14 correlate film volume swell with D.C. resistance change in the film. The comparative data for development of these curves was obtained using conductive Neoprene latex films made as described above and have a thickness of 20 mils. Curve 11 shows the resistance change in ohms of a water-immersed unleached cured film and curve 12 shows the percent volume swell of the same film. Curve 13 shows the resistance change in ohms of a cured film which had been leached in boiling water for 8 hours prior to cure and curve 14 the percent volume swell of the same film. It is apparent from a reading of the curves 11, 12, 13 and 14 that there is a close relationship between the amount of swelling and the change in the electrical resistance of the film which takes place in a cured latex conducting film in the presence of moisture.

While my invention has been described in detail with respect to improvement in conductive films of Neoprene latex, it will be obvious to those skilled in the art that the principle of the method of my invention is also applicable to the treatment of conducting films of latices generally, whether they be of natural or of synthetic origin, and irrespective of the method of casting of the films. Accordingly, it is not intended that specific embodiments to which reference has been made herein in describing my invention shall be construed as limiting except as may be required by the appended claim.

What is claimed is:

A method of preparing thin cured conducting polychloroprene latex films of high electrical conduction stability in the presence of moisture which comprises casting a thin film from an aqueous compound polychloroprene latex composition containing water-soluble ingredients and dispersed conducting carbon particles, air drying said film, subjecting said air-dried film to boiling in water for a period of time sufficient to leach out at least substantially all of the water-soluble constituents from said film, and drying and curing said leached film in hot air.

References Cited in the file of this patent

UNITED STATES PATENTS

| 2,120,720 | Spanel | June 14, 1938 |
| 2,302,003 | Cadwell et al. | Nov. 17, 1942 |

FOREIGN PATENTS

| 107,831 | Australia | July 13, 1939 |